Oct. 6, 1953                J. LYDFORS                2,654,455
                  ENGAGEABLE AND RELEASABLE AXLE CLUTCH
Filed Feb. 1, 1950                                3 Sheets-Sheet 1
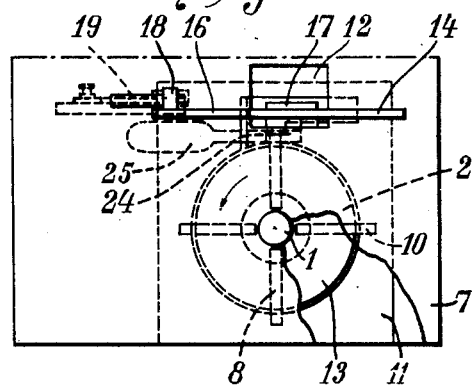
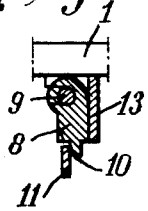
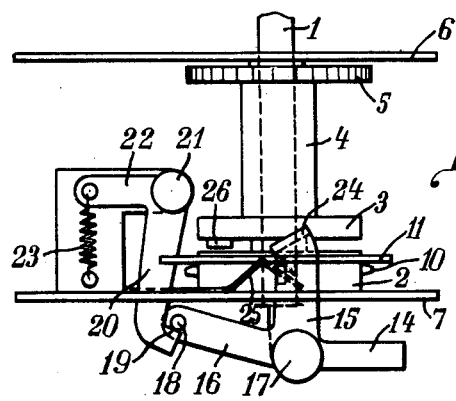
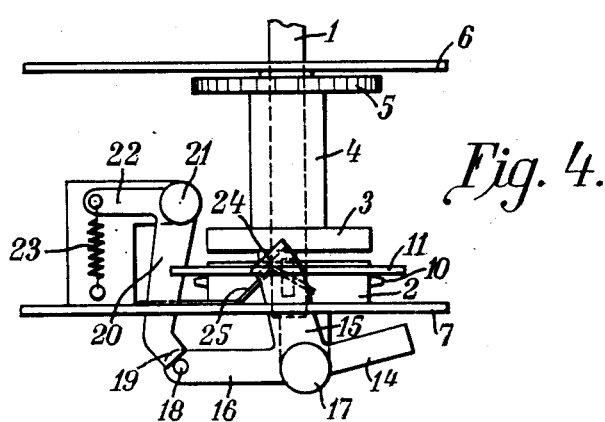
INVENTOR
JOHN LYDFORS
BY:
Haseltine, Lake & Co.
AGENTS Oct. 6, 1953 J. LYDFORS 2,654,455
ENGAGEABLE AND RELEASABLE AXLE CLUTCH
Filed Feb. 1, 1950 3 Sheets-Sheet 2

INVENTOR
JOHN LYDFORS
By:
Haseltine, Lake & Co.
AGENTS

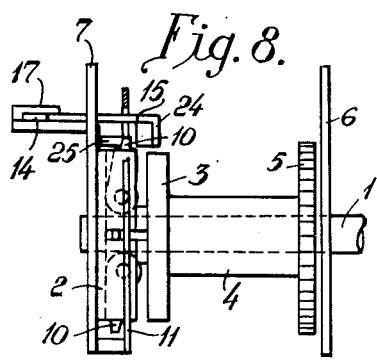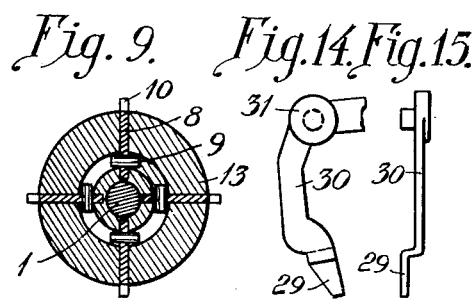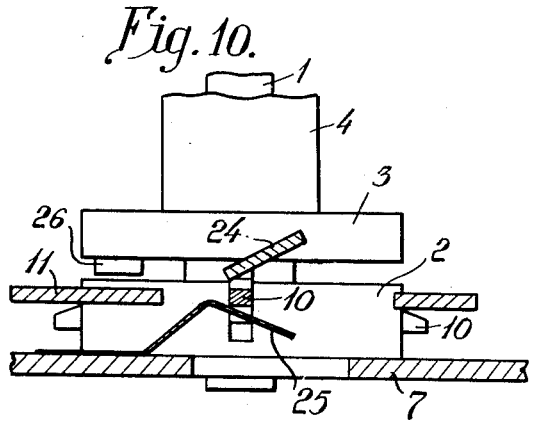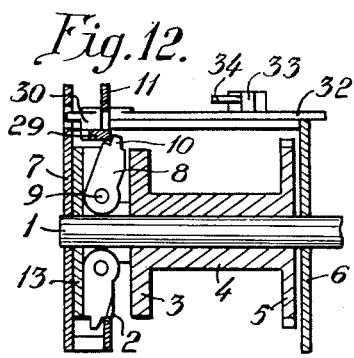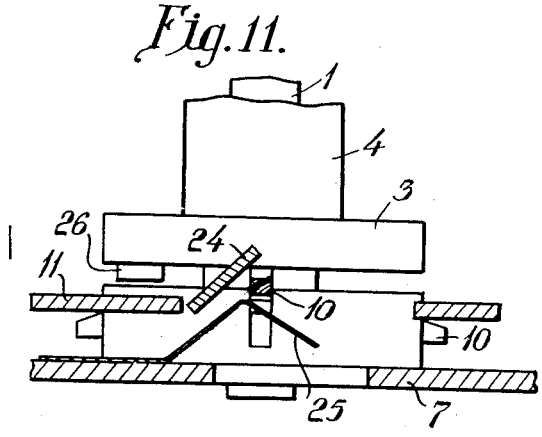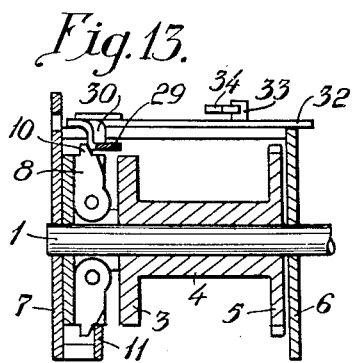

Patented Oct. 6, 1953

2,654,455

UNITED STATES PATENT OFFICE 2,654,455

ENGAGEABLE AND RELEASABLE AXLE CLUTCH

John Lydfors, Stockholm, Sweden, assignor to Aktiebolaget Dixma, Malmö, Sweden

Application February 1, 1950, Serial No. 141,685
In Sweden December 30, 1944

3 Claims. (Cl. 192—22)

The present invention relates to an axle clutch, and is particularly directed to a clutch for driving rotatable members in calculating machines and the like.

An object of the present invention is to provide a clutch wherein the coupling together of the driving and driven parts of the clutch can be achieved quickly and reliably during the movement of the driving part through only a fraction of a complete revolution.

Another object is to provide a clutch wherein the force required to effect engagement and release of the clutch is relatively small.

In accordance with the present invention, the above objects are achieved by providing the driving part of the clutch with one or more coupling members which are axially adjustable and arranged successively in the direction of rotation. A guide path is provided for guiding the coupling members and includes an inclined section and a contiguous section which is formed to displace the coupling members to the clutch engaging positions thereof. Guide members are provided at the contiguous section of the guide path and operate to force the coupling members out of that section when the clutch is in its released condition. When the clutch is engaged, the guide members are withdrawn to inoperative positions and the coupling members move from the inclined section of the guide path into the contiguous section thereof to engage a lug, boss or the like projecting from the driven part of the clutch and constrain the driven part to rotate co-axially with the driving part.

The above and other objects, features and advantages of the present invention will be apparent in the following description of illustrative embodiments thereof when the same is read in connection with the accompanying drawings forming a part hereof and wherein:

Fig. 1 is a side elevational view of one embodiment of the present invention;

Fig. 2 is a fragmentary sectional view of a rocking lever included in the embodiment of Fig. 1;

Figs. 3 and 4 are top plan views showing the embodiment of Fig. 1 in two different operative positions;

Fig. 8 is an elevational view of the embodiment of Fig. 1, looking in the direction at right angles to the axis, and showing the operating parts in the positions of Fig. 3;

Fig. 9 is a radial sectional view of a rotor and rocking levers thereon included in the embodiment of Fig. 1;

Figs. 10 and 11 are horizontal sectional views showing the operating parts of Fig. 8 in the positions of Figs. 3 and 4, respectively;

Figure 5:
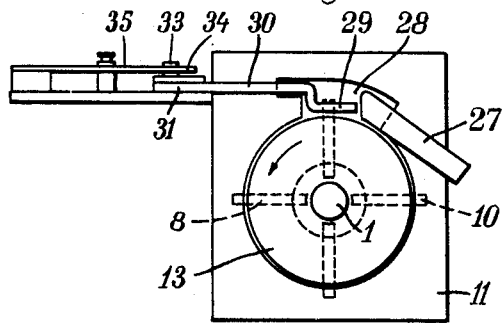
Fig. 5 is a side elevational view of another embodiment of the present invention.
Figure 6:
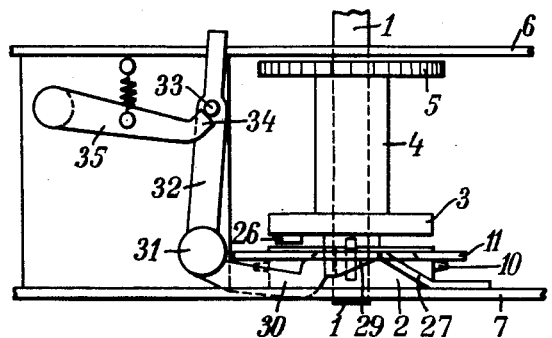
Figs. 6 and 7 are top plan views showing the embodiment of Fig. 5 in two different operative positions.
Figure 7:
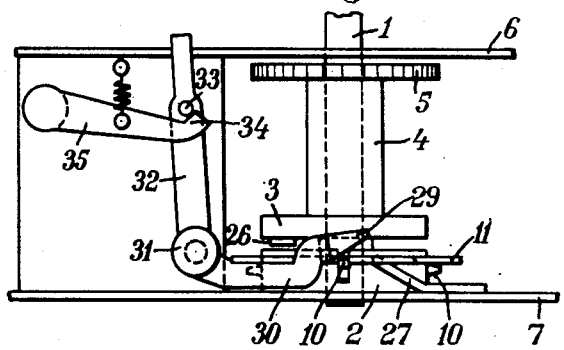

Figs. 12 and 13 are axial sectional views of the operating parts of the embodiment of Fig. 5 and shown in the positions of Figs. 6 and 7, respectively; and Figs. 14 and 15 show two different views of a detail included in embodiments of this invention.

Referring to the drawings in detail, it will be seen that, in both illustrated embodiments of the invention, a driving shaft 1 is connectable to a source of power (not shown) and has a rotor 2 fixed thereon to form the driving part of the clutch. The driven part of the clutch consists of a rotatable disc 3 which is co-axial with the rotor 2 and mounted upon a hollow axle or shaft 4 through which the shaft 1 extends. The hollow axle 4, at its end remote from disc 3, is provided with a cog wheel or gear 5, or some other suitable driving member, by means of which the driven part of the clutch can be coupled to a machine or mechanism to be driven, for example, rotatable members in a calculating machine. The shaft 1 is preferably journalled in suitable supporting walls or standards 6 and 7.

The rotor 2, forming the driving part of the clutch, is provided with four radially extending rocking levers 8 (Figs. 1 and 2 or Fig. 5). As seen in Fig. 2, each rocking lever 8 is pivoted at its radially inner end on a pin 9 carried by the rotor 2 so that the outer end of the rocking lever, which is formed as a finger 10, is movable in a direction generally parallel to the axis of rotation of the rotor. A fixed radial wall 11 extends around the periphery of the rotor 2 and is positioned so that the fingers 10 of the rocking levers normally rotate with the rotor at one side of the fixed wall 11. However, the rocking levers 8 can be swingably displaced in the axial direction of rotor 2 to dispose the fingers 10 of the levers at the opposite side of wall 11. In order to permit the swinging movement of rocking levers 8 for positioning the fingers 10 thereof at one or the other of the sides of fixed wall 11, the latter is formed with an opening 12 through which the fingers 10 may pass during the swinging movement of the related rocking levers. Each of the rocking levers 8 normally rests against a radial wall 13 (Fig. 2) which forms a part of the rotor 2.

Referring specifically to Figs. 1 to 4 and 8 to 11, it will be seen that the embodiment of the invention there illustrated includes an adjusting mechanism consisting of a three-armed member having arms 14, 15 and 16 radiating from a common hub which is pivotally mounted, as at 17, on a suitably fixed support extending from the standard 7. The arm 14 provides an operating lever, and the arm 16 cooperates with suitable mechanism, hereinafter described, to maintain the three-armed member in one or the other of two angular positions shown in Figs. 3 and 4, respectively. The mechanism cooperating with arm 16 to position the three-armed member includes a bell-crank lever having two angularly related arms 20 and 22 and rockably mounted, at the junction of these arms, on a suitable pivot 21. The free end of lever arm 20 is formed with a nose or detent 19 having two oppositely inclined or converging edge faces which are alternately engaged by a pin 18 carried by the free end of the arm 16. Thus, when the pin 18 engages one edge face of nose 19, as in Fig. 3, the three-armed member is held in one position and, when the pin 18 engages the other edge face of nose 19, as in Fig. 4, the three-armed member is held in another position. A spring 23 is connected at one end to the free end of arm 22 and, at its other end, to a fixed attachment so that the bell-crank lever is continuously urged to rotate in the counter-clockwise direction, as viewed in Figs. 3 and 4. Thus, the nose 19 is continuously urged in the direction toward the pivoting axis 17 of the three-armed member to produce engagement of one or the other of the inclined edge faces of nose 19 with the pin 18.

The arm 15 extends through the opening 12 of the wall 11 and terminates in a downwardly directed guide flange 24 (Figs. 3, 4, 8, 10 and 11) which is inclined relative to the plane of rotation of the fingers 10 on rocking levers 8. The guide flange 24 is arranged to intersect the plane of wall 11 when the arm 15 is in its operative position (Fig. 4), and moves out of the plane of wall 11 in the direction away from standard 7 when arm 15 is in its inoperative position (Fig. 3). The adjusting mechanism also includes a spring member 25 fixed to the standard 7 and having an angularly bent portion extending into the opening 12 of wall 11 from the side of the latter closest to the standard 7. The angularly bent portion of spring member 25 includes two oppositely inclined legs which coverge in the direction toward wall 11 (Figs. 3, 4, 10 and 11).

When rotor 2 is rotated in the direction of the arrow on Fig. 1, the fingers 10 of the rocking levers 8 successively move along the side of wall 11 facing toward standard 10 and pass the opening 12 of wall 11. As the fingers 10 move past opening 12, the successive fingers engage the leg of spring member 25 inclined in the direction of movement of the fingers toward the wall 11, and such engagement causes each of the fingers 10 to be displaced axially of rotor 2 through the opening 12 to the side of wall 11 remote from standard 7. When the arm 15 is in its inoperative position (Figs. 3 and 10), corresponding to engagement of the clutch, the guide flange 24 depending from arm 15 is displaced from the spring member 25 so that the successive fingers 10 may pass between the guide flange and spring member to a path of movement at the side of wall 11 facing toward the rotatable disc 3 forming the driven part of the clutch.

The disc 3 is provided with a lug or projection 26 extending axially in the direction toward wall 11 to intercept the path of fingers 10 when the latter move along the side of wall 11 facing toward disc 3. Thus, when the arm 15 and its guide flange 24 are in their inoperative positions (Figs. 3 and 10), the first finger 10 displaced axially by the spring member 25 to travel between wall 11 and disc 3 will engage projection or lug 26 to drive the latter and the disc before it, thereby communicating the rotation of shaft 1 and rotor 2 to the disc 3 and, through hollow shaft 4, to the gear 5. Accordingly, the clutch is then in its engaged condition, however, such engagement of the clutch persists during only a single rotation of the finger 10 acting against lug 26. As the finger 10 completes a revolution, it engages against the guide flange 24 and adjusts the latter and its arm 15 to the operative position (Figs. 4 and 11). When the guide flange 24 is adjusted to its operative position, the guide flange directs the finger causing the swinging adjustment of arm 15 and the following fingers toward standard 7 and into the path of rotation at the side of wall 11 remote from disc 3 and its lug 26. Thus, the fingers 10 are freed from the lug 26 and the clutch is disengaged.

Assuming that the driving shaft 1 is continuously rotated, the clutch is maintained in its disengaged condition by movement of arm 14 to its operative position (Fig. 4). When arm 14 is in its operative position, the successive fingers 10, after being deflected toward disc 3 by the spring member 25 engage against guide flange 24 (Fig. 11) and are returned by the latter to the normal path of rotation at the side of wall 11 remote from disc 3. Engagement of the clutch for a single revolution of driving shaft 1 is effected by adjusting arm 14 to bring arm 15 and its guide flange 24 to the inoperative positions (Figs. 3 and 10) so that the finger 10 first engaging spring member 25 after such adjustment is brought into contact with lug 26 for a single revolution and then automatically returned to the normal, or clutch disengaging, path at the completion of the single revolution, as described above.

Another embodiment of the present invention is illustrated in Figs. 5 to 7 and 12 to 15, and differs from the first described embodiment only in the adjusting mechanism for the rocking levers which permits engagement of the clutch for any desired number of revolutions of the driving shaft, and the same reference numerals will be used in describing those parts of the second embodiment which correspond to the related parts of the first described embodiment.

In the embodiment of Figs. 5 to 7 and 12 to 15, the fingers 10 of the rocking levers 8 normally rotate in a path at the side of wall 11 remote from disc 3 so that the rocking levers do not engage the lug 26 extending from the disc and the clutch is disengaged. A fixed guide member or bar 27 is carried by standard 7 and inclines in the direction of rotation of rotor 2 toward the wall 11 to be engaged by the successive fingers for deflecting the same from the normal path through an opening 28 in wall 11. A movable guide member 29 is formed with an edge which is inclined in the direction opposite to the inclination of fixed guide member 27 and is carried on a swingable arm 30 which is pivotally mounted, as at 31, for swinging movement between the inoperative and operative positions shown in Figs. 6 and 12 and Figs. 7 and 13, respectively. When movable guide member 29 is disposed in its operative position (Figs. 7 and 13), each of the fingers 10, after being deflected through opening 28 of wall 11 by the fixed guide member 27, engages the inclined edge of guide member 29 and is deflected back by the latter to the side of wall 11 remote from disc 3. When the movable guide member 29 is disposed in its inoperative position (Figs. 6 and 12), the inclined edge thereof is located at the side of wall 11 remote from disc 3 so that the fingers 10, after being deflected through opening 28 toward disc 3 by the fixed guide member 27, clear the movable guide member and continue along the path disposed between wall 11 and disc 3. Thus, after the movable guide member 29 is moved to its inoperative position, the rocking lever whose finger 10 next engages guide member 27 will be shifted to the side of wall 11 facing toward disc 3 to engage projection 26 on the disc so that the clutch is then engaged.

So long as movable guide member 29 is retained in its inoperative position (Figs. 6 and 12), the active rocking lever 8 will continue to engage the projection 26 for driving the latter before it. Thus, the embodiment of Figs. 5 to 7 and 12 to 15, permits the clutch to remain engaged for any desired number of revolutions. When the movable guide member 29 is adjusted to its operative position (Figs. 7 and 13), the finger 10 of the rocking lever 8 engaging projection 26 will ride against the inclined edge of movable guide member 29 and be deflected away from disc 3 through opening 28 to continue its movement along the side of wall 11 remote from the disc. Thus, the active rocking lever is freed from projection 26 and the clutch is disengaged.

In order to provide for movement of the arm 30 to dispose the movable guide member 29 in either its operative or inoperative position, an actuating arm 32 is formed integrally with the arm 30 and at an angle to the latter. The arm 32 may be extended sufficiently to permit its manual actuation. In order to yieldably retain the movable guide member 29 in either one of its operative and inoperative positions, a pin 33 is provided on actuating arm 32 for engagement with one or the other of two converging edges formed on a nose 34 of a lever 35. The lever 35 is pivotally mounted at its end remote from the nose 34 and a spring acts on lever 35 to continuously urge the latter in the counter-clockwise direction, as viewed in Figs. 6 and 7. Thus, when pin 33 engages one edge of nose 34 the movable guide member will be yieldably held in its operative position (Fig. 7), while engagement of pin 33 with the other inclined edge of nose 34 results in the yieldable retention of the movable guide member in its inoperative position (Fig. 6).

While the embodiment first described herein provides for engagement of the clutch for only a single revolution and the last described embodiment provides for engagement of the clutch for any desired number of revolutions, both embodiments provide almost instantaneous engagement of the clutch following manipulation of the control (the arm 14 or the arm 32) to the position for engagement of the clutch. The time lag between such manipulation and actual engagement of the clutch corresponds, at most, to the time required for rotation of the rotor 2 through the angular distance between the successive rocking levers 8. Thus, the time lag can be reduced by increasing the number of rocking levers on the rotor, and quick engagement can be obtained with a clutch for connecting a continuously rotating shaft to a driven member.

While I have described several embodiments of the invention, it is to be understood that the invention is not limited to these precise embodiments and that various changes and modifications may be made therein without departing from the scope of the invention, which is intended to be defined in the appended claims.

What I claim is:

1. In an axle clutch device; the combination of a driven disc having an eccentrically arranged lug thereon, a driving rotor concentric with and adjacent to said driven disc, a plurality of equidistantly and radially disposed rocking levers on said driving rotor, pivot pins arranged in the central portion of said driving rotor and carrying said rocking levers for swinging in the axial direction of said rotor from a normal path of rotation into the path of rotation of said lug, a stationary guiding wall arranged parallel and adjacent to the path of said lug, both sides of said wall being formed to serve as guiding surfaces for the outer ends of the rocking levers, said wall having an opening therein permitting said rocking levers to pass from said normal path of rotation on one side of the wall to the other side of said wall and into said path of the lug, a stationary guiding member disposed to force the rocking levers from said normal path through said opening into said path of the lug, and an adjustable guiding member operative to bring back the rocking levers through said opening into said normal path of rotation.

2. In an axle clutch device; the combination as set forth in claim 1, wherein said adjustable guiding member is mounted for movement in the direction of rotation of said driving rotor from an inoperative position extending across said path of the lug into an operative position so that said adjustable guiding member may be carried along into said operative position by one of the rocking levers moving along said path of the lug.

3. In an axle clutch device; the combination as set forth in claim 1, wherein said stationary guiding member is resilient for permitting the rocking levers to move with snap action when guided by said adjustable guiding members.

JOHN LYDFORS.

References Cited in the file of this patent

UNITED STATES PATENTS

| Number | Name | Date |
| --- | --- | --- |
| 1,211,143 | Grothey | Jan. 2, 1917 |
| 2,436,625 | Wehr | Feb. 24, 1948 |